(12) United States Patent
Terleski et al.

(10) Patent No.: US 9,317,857 B1
(45) Date of Patent: Apr. 19, 2016

(54) OPTIMIZING PROVISION OF ENGAGEMENT ENHANCING CONTENT TO USERS

(75) Inventors: Jonathan Terleski, Mountain View, CA (US); Gregory Matthew Marra, San Francisco, CA (US); Bradley Horowitz, Palo Alto, CA (US)

(73) Assignee: GOOGLE INC., Mountain View, CA (US)

(*) Notice: Subject to any disclaimer, the term of this patent is extended or adjusted under 35 U.S.C. 154(b) by 367 days.

(21) Appl. No.: 13/281,373

(22) Filed: Oct. 25, 2011

Related U.S. Application Data

(60) Provisional application No. 61/534,340, filed on Sep. 13, 2011.

(51) Int. Cl.
  *G06F 15/16* (2006.01)
  *G06Q 30/02* (2012.01)
  *G06F 3/048* (2013.01)

(52) U.S. Cl.
  CPC ............... *G06Q 30/02* (2013.01); *G06F 3/048* (2013.01)

(58) Field of Classification Search
  CPC .... G06Q 30/02; G06Q 30/0241; H04L 67/02; H04L 67/22; G06F 3/048
  USPC .................................. 709/203, 217, 218, 219
  See application file for complete search history.

(56) References Cited

U.S. PATENT DOCUMENTS

| | | | |
|---|---|---|---|
| 7,209,916 B1 | 4/2007 | Seshadri et al. | |
| 7,242,421 B2 | 7/2007 | Center, Jr. et al. | |
| 8,122,014 B2* | 2/2012 | Brindley | G06F 17/30887 705/14.4 |
| 2002/0052925 A1* | 5/2002 | Kim | H04L 29/06 709/217 |
| 2004/0215757 A1* | 10/2004 | Butler | H04L 67/18 709/223 |
| 2005/0080878 A1* | 4/2005 | Cunningham | G06Q 30/02 709/219 |
| 2006/0248153 A1* | 11/2006 | Hejza Litwiller | H04L 63/083 709/206 |
| 2007/0244739 A1 | 10/2007 | Soito et al. | |
| 2008/0071881 A1* | 3/2008 | Kronlund | G06Q 30/0258 709/217 |
| 2009/0019039 A1* | 1/2009 | Brindley | G06Q 30/0241 |
| 2009/0300406 A1* | 12/2009 | Katou | G06F 11/328 714/3 |
| 2011/0145323 A1* | 6/2011 | Kahn | H04L 67/16 709/203 |
| 2012/0054303 A1* | 3/2012 | Priyadarshan | G06Q 30/0254 709/217 |
| 2012/0331098 A1* | 12/2012 | Ertugrul | G06Q 30/02 709/217 |
| 2013/0080972 A1* | 3/2013 | Moshrefi | G06F 3/048 715/808 |
| 2013/0144940 A1* | 6/2013 | Law | H04L 65/4069 709/203 |

* cited by examiner

*Primary Examiner* — Emmanuel L Moise
*Assistant Examiner* — Vitali Korobov
(74) *Attorney, Agent, or Firm* — McDermott Will & Emery LLP

(57) ABSTRACT

A system and machine-implemented method for providing engagement enhancing content to a user with minimal interference with activities performed by the user at a website including receiving an indication of an event at a website, wherein the event represents the user actively interacting with the content at the website, suspending the provision of one or more engagement enhancing content to the user in response to receiving the indication of the event, wherein the engagement enhancing content is configured to encourage user interaction with the website, receiving an indication of a second event at the website, wherein the second event corresponds to the user no longer actively interacting with content at the website and resuming provision of the one or more engagement enhancing content to the user in response to receiving an indication of the second event.

16 Claims, 5 Drawing Sheets

OPTIMIZING PROVISION OF ENGAGEMENT ENHANCING CONTENT TO USERS

CROSS-REFERENCE TO RELATED APPLICATIONS

The present application claims the benefit of priority under 35 U.S.C. §119 from U.S. Provisional Patent Application Ser. No. 61/534,340 entitled "OPTIMIZING PROVISION OF ENGAGEMENT ENHANCING CONTENT TO USERS," filed on Sep. 13, 2011, the disclosure of which is hereby incorporated by reference in its entirety for all purposes.

BACKGROUND

The subject disclosure generally relates to presenting content to a user, and, in particular, to presenting content to a user browsing a website.

When users are interacting with content on a website, there is often possibility for the user to become disengaged or disinterested in the website. Therefore, various animations and dynamic content may be presented to the user to entice the user to remain engaged with the website. Such content may include background animation or notifications presented while the user is browsing a website to keep the attention of the user and ultimately improve the user's overall engagement with the website content.

While such content may be helpful for engaging the user, the content may also have the potential to distract the user from other actions the user may be performing at the website. Thus, there may be cases where the content causes the user to halt interaction with the website before completing an action due to being distracted by the content, ultimately reducing user engagement with the website.

Thus, a method for optimally presenting such engagement enhancing content to users while minimizing the distracting effect of such content on the activities of the user may be desirable.

SUMMARY

The disclosed subject matter relates to a machine-implemented method for providing engagement enhancing content to a user without interfering with activities performed by the user at a website, the method comprising receiving an indication of an event at a website, wherein the event represents the user actively interacting with the content at the website. The method further comprising suspending the provision of one or more engagement enhancing content to the user in response to receiving the indication of the event, wherein the engagement enhancing content is configured to encourage user interaction with the website. The method further comprising receiving an indication of a second event at the website, wherein the second event corresponds to the user no longer actively interacting with content at the website and resuming provision of the one or more engagement enhancing content to the user in response to receiving an indication of the second event.

The disclosed subject matter also relates to a system for providing engagement enhancing content to a user interacting with a website, the system comprising one or more processors and a machine-readable medium comprising instructions stored therein, which when executed by the processors, cause the processors to perform operations comprising receiving an indication of a user state of a user being set to actively engaged, wherein the user state being set to actively engaged reflects that the user is actively interacting with the content at the website, the operations further comprising suspending the provision of one or more engagement enhancing content to the user in response to receiving the indication, wherein the engagement enhancing content is configured to encourage user interaction with the website. The operations further comprising determining that the user state has been set to passively browsing, wherein the user state being set to passively browsing reflects that the user is no longer actively interacting with content at the website and resuming provision of the one or more engagement enhancing content to the user in response to determining that the user state has been set to passively browsing.

The disclosed subject matter further relates to a machine-readable medium comprising instructions stored therein, which when executed by a machine, cause the machine to perform operations comprising receiving an indication of a user actively interacting with the content at a website. The operations further comprising setting a user state of the user to actively engaged in response to receiving the indication of the event. The operations further comprising suspending the provision of one or more engagement enhancing content to the user in response to the user state being set to actively engaged, wherein the engagement enhancing content is configured to encourage user interaction with the website. The operations further comprising receiving an indication that the user is no longer actively interacting with the website. The operations further comprising setting a user state of the user to passively browsing in response to receiving the indication that the user is no longer actively interacting with the website and resuming provision of the one or more engagement enhancing content to the user in response to setting the user state to passively browsing.

The disclosed subject matter also relates to a machine-implemented method for providing engagement enhancing content to a user with minimal interference with activities performed by the user at a website, the method comprising receiving engagement enhancement content for provision to a user, wherein the engagement enhancing content is configured to encourage user interaction with the website. The method further comprising determining a user state, wherein the user state is one of actively engaged and passively browsing, and reflects whether the user is actively interacting with the content at the website. The method further comprising delaying the provision of the engagement enhancement content to the user if the user state is set to actively engaged until the user state is set to passively browsing and presenting the engagement enhancement content to the user when the state of the user state is set to passively browsing.

The disclosed subject matter also relates to a system for providing engagement enhancing content to a user with minimal interference with activities performed by the user at a website, the system comprising one or more processors and a machine-readable medium comprising instructions stored therein, which when executed by the processors, cause the processors to perform operations comprising receiving engagement enhancement content for provision to a user, wherein the engagement enhancing content is configured to encourage user interaction with the website. The operations further comprising determining whether a user state of the user is set to actively engaged, wherein the user state being set to actively engaged reflects that the user is actively interacting with the content at the website. The operations further comprising delaying the provision of the engagement enhancement content to the user if the user state is set to actively engaged. The operations further comprising determining that the user state is set to passively browsing, wherein the user state being set to passively browsing indicates that the user is not longer actively interacting with the content at the website and presenting the engagement enhancement content to the user in response to determining that the user state is set to passively browsing.

The disclosed subject matter further relates to a machine-readable medium comprising instructions stored therein, which when executed by a machine, cause the machine to perform operations comprising receiving engagement enhancement content for provision to a user, wherein the engagement enhancing content is configured to encourage user interaction with the website. The operations further comprising determining that a user is actively interacting with the content at the website. The operations further comprising delaying the provision of the engagement enhancement content to the user in response to determining that the user is actively interacting with the website. The operations further comprising determining that the user is no longer actively interacting with the website and presenting the engagement enhancement content to the user in response to determining that the user is no longer actively interacting with the website.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

As used herein, "engagement enhancing content" refers to various dynamic content (e.g., animations, music, video or notifications), presented to the user to entice the user to remain engaged with a website. The engagement enhancing content may be presented in the background while the user is engaging in activities within a website. For example, engagement enhancing content may be notifications-type dynamic content presented to the user (e.g., as pop-up notification windows, a notification counter) that smoothly animate real time events (e.g., posts or comments entered by other users, friend requests received, a new message or chat message received with respect to a social networking website). Additionally, engagement enhancing content may include ongoing or period engagement enhancing content (e.g., background visual effects such as color changes or other ongoing background animation within a website, music or videos, etc.).

While such engagement enhancing content may be helpful for engaging the user, such content may also have the potential to distract the user when the user is performing other actions at the website. The user may halt the action before completion, as a result of becoming distracted by the engagement enhancing content, thus ultimately reducing user engagement with the website.

The present subject matter provides a system for optimally presenting engagement enhancing content to reduce distractions during periods where the user is actively engaged at the website. Since the overall goal is to improve the user's engagement with the website, it may be beneficial to provide the engagement enhancing content when the user is not otherwise actively engaged with the website where such engagement enhancing content may distract and discourage the user's active engagement.

Figure 1:
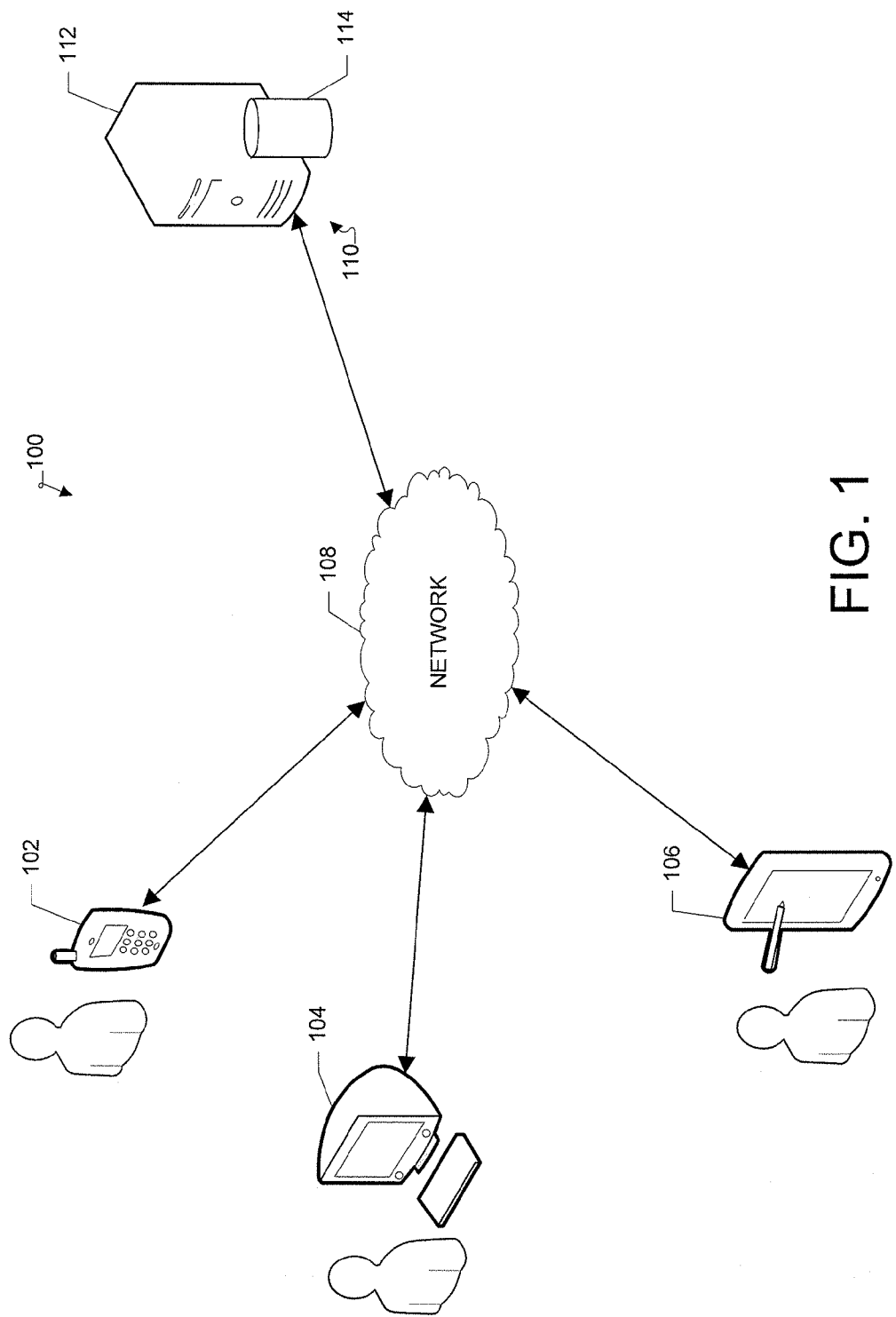
FIG. 1 illustrates an example client-server network environment which provides for presenting engagement enhancing content to a user at a website.

FIG. 1 illustrates an example client-server network environment which provides for presenting engagement enhancing content to a user at a website. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in group conversation between electronic devices 102-106.

Users interacting with a client device (e.g., electronic devices 102, 104 and 106), may access a website and begin browsing content displayed at the website. The system (e.g., through server 110) may receive various indications of activities performed by the users while browsing the website. For example, user activities may be indicated by keyboard navigation at the client device around the page or detecting the location on the viewport. Scroll or pause events may similarly be detected (e.g., by receiving an indication of such actions being performed at the user client device). Furthermore, the system may receive data indicative of the user's interaction with any inline interactive media (e.g., the user watching videos, listening to music or playing games at the website). In addition, the system may receives indication of the user's interaction with various applications embedded within the website (e.g., chat services), and may receive an indication of user activity with respect to such applications. Indication of a user interacting with the website content is received by the system (e.g., at server 110) and analyzed to determine a state for each user interacting with the website at a client device (e.g., electronic devices 102, 104 and 106). A user state is set to one of an actively engaged state and passively browsing state as a result of receiving indications of activities and analyzing the activities of the user with respect to the website content.

While the user is interacting with the website, the system may provide engagement enhancing content to be displayed to the user. The engagement enhancing content may be generated (e.g., by the system or externally generated and transmitted to the system) in response to events (e.g., as notifications) or may be periodic or ongoing engagement enhancing content (e.g., background animation or audio) displayed to the user at the website to keep the user engaged with the website content. The engagement enhancing content may be transmitted to the client device (e.g., electronic devices 102, 104 and 106) for display to the user based on the user state maintained by the system (e.g., at server 110).

In some example embodiments, electronic devices 102-106 can be computing devices such as laptop or desktop computers, smartphones, PDAs, portable media players, tablet computers, or other appropriate computing devices that can be used to for group conversation within a social network. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). Furthermore, network 108 can be a public communication network (e.g., the Internet, cellular data network, dialup modems over a telephone network) or a private communications network (e.g., private LAN, leased lines).

Figure 2:
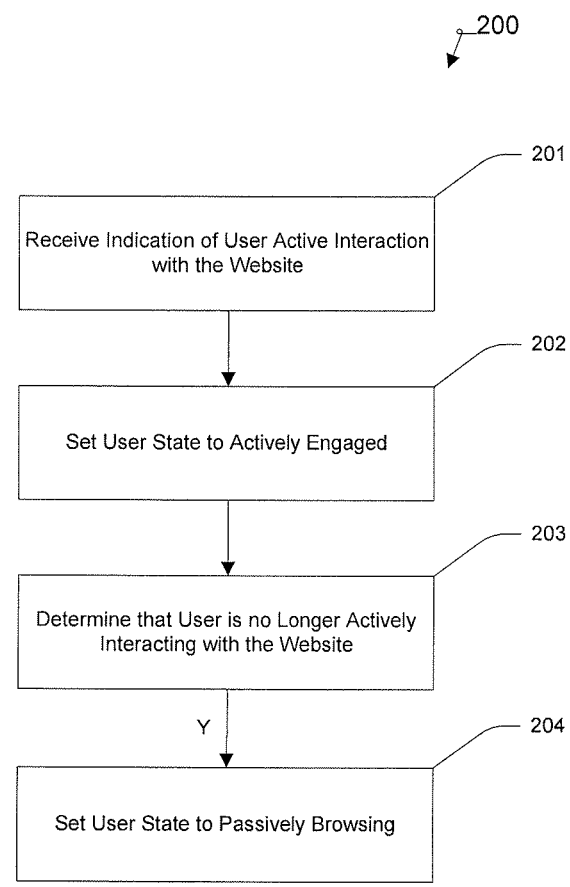
FIG. 2 illustrates a flow chart of an exemplary process for determining a user state for a user based on the interaction of the user with a website.

FIG. 2 illustrates a flow chart of an exemplary process 200 for determining a user state for a user based on the interaction of the user with a website. The process begins in step 201 when the system receives an indication of the user actively interacting with the website content. The system may receive indications of user interaction with the website. The indication of the user actively interacting with the website content may be determined based on various signals representing the user's actions at the website. These signals may be received by the system in response to detecting various actions taken by the user while interacting with the website (e.g., in response to indications of user interaction with the website).

The signals may include receiving an indication or detecting that the user is focused within a text area or input field (e.g., by determining the user's keyboard navigation around the page or receiving an indication of the user's location on the viewport). Furthermore, the signals may include receiving an indication or detecting that the user is actively reading content at the website (e.g., by determining the user's keyboard navigation around the page or the user's location on the viewport), or is actively engaged in a read and consume mode (e.g., where the system detect a series of scroll and pause events at the website signaling that the user is actively browsing content on the website).

Furthermore, receiving an indication that the user is actively engaged in viewing and/or interacting with inline or embedded interactive media such as games, video, audio, or other multimedia content may indicate that the user is actively interacting with the website. Similarly, a user actively engaged in a chat session or other messaging activity may be identified as actively interacting with the website. Additionally, an indication of active interaction may be received by the system if the user is posting content to the website (e.g., as a message, post, survey or during a set-up or sign-up process), uploading content (e.g., photos, videos, music), or downloading content from the website. Similarly detecting or receiving an indication that the user is engaged in other "high cognitive load" activities (e.g., adding friends, adding circles, modifying circles, modifying profile, etc.) may be an indication of the user actively interacting with the website being received by the system in step 201. The above listing is an example of various actions which may indicate a user actively engaging with the content, and other various actions may similarly server as indication that the user is actively interacting with a website.

Any one or a combination of the above described signals may indicate the user actively interacting with the website. Furthermore, some or all of the signals may be weighted and a combination score of one or more of the signals may indicate that the user is actively interacting with the website (e.g., based on a predefined threshold). Once the system receives an indication that the user is actively interacting with the website based on one or more of the above signals, the process continues to step 202.

In step 202, the system sets the user state for the user to actively engaged. The system may maintain a user state for one or more users interacting with the website at one or more client devices (e.g., electronic devices 102, 104 and 06). Upon setting the state of the user to actively engaged, the system may begin a counter to measure the time lapsed since the indication of the user actively interacting with content was received. Alternatively, the system may begin the counter upon receiving an indication that the action(s) that caused the system to set the user state to actively engaged has terminated.

In step 203, the system determines that user is no longer actively interacting with the website (i.e., users active interaction has terminated). In one example, the system may receive an indication that the user is no longer actively interacting with the website. Additionally, the system may allow for a predetermined time before inferring that the user is no longer actively engaged with the website. For example, once the system determines that a predetermined time has lapsed since the user began performing an action indicating active interaction with the website or since the user terminated the action, the system may determine that the user is no longer actively interacting with the website. The time lapsed may be determined based on the counter activated in response to the user state being set to actively engaged.

The predetermined amount of time lapsed that may indicate that the user is no longer actively interacting with the website may depend upon the signal (or a combination of signals) that caused the user state to be set to actively engaged. Various other factors such as the amount of content, the type of content, and/or user characteristics may also factor into the predetermined amount of time that must lapse before the system determines that the user is no longer actively interacting with the website (e.g., an intellectually intensive article may take a longer time to read). The counter may be restarted (e.g., set to zero), if a new indication of user interaction with the website is received by the system, such that the user state remains at actively engaged as long as the user is performing various actions representing an indication of active interaction with the website. Once in step 203, the system determines that the user is no longer actively interacting with the website, the user state of the user is set to passively browsing in step 204.

Figure 3:
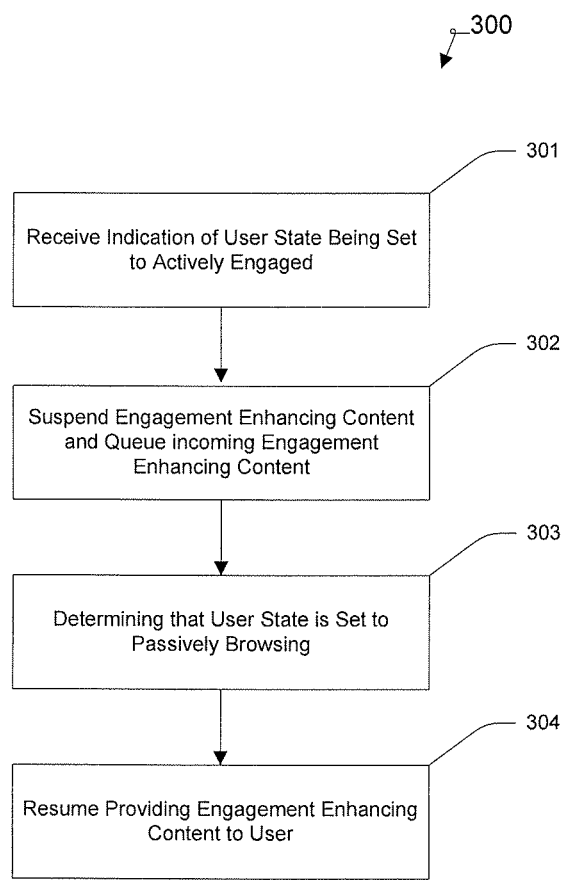
FIG. 3 illustrates a flow chart of an exemplary process for optimally presenting engagement enhancing content for display to a user.

FIG. 3 illustrates a flow chart of an exemplary process 300 for optimally presenting engagement enhancing content for display to a user. Process 300 optimizes the benefits of the engagement enhancing content displayed to the user interacting with a client device (e.g., electronic devices 102, 104 and 106) by presenting the engagement enhancing content in a manner that is aimed to reduce distractions during periods where the user is actively engaged at the website.

The process begins in step 301 where the system (e.g., at server 110) receives an indication of the user state being set to actively engaged. Upon receiving the indication that the user state has been set to actively engaged in step 302, the system suspends engagement enhancing content being displayed to a user and may queue any engagement enhancing content that may be generated or received for display to the user. The engagement enhancing content may include notifications presented to a user or ongoing or period engagement enhancing content and may include any visual or audible engagement enhancing content. All or some of the engagement enhancement content may be suspended when the system receives the indication that the user state has been set to actively engaged.

In step 303, the system determines that the user state has been set to passively browsing. For example, the system may receive an indication that the user state has been modified. Alternatively, the system may periodically check the user state until it is determined that the user state has been set to passively browsing. Once it is determined that the user state has been changed to passively browsing in step 303, the process continues to step 304.

In step 304, the system resumes providing engagement enhancing content to the user. The queued engagement enhancing content (e.g., notifications, messages) may be provided to the user once the system resumes providing the engagement enhancing content. In some examples, only some of the engagement enhancing content may be queued and/or provided for display to the user.

Figure 4:
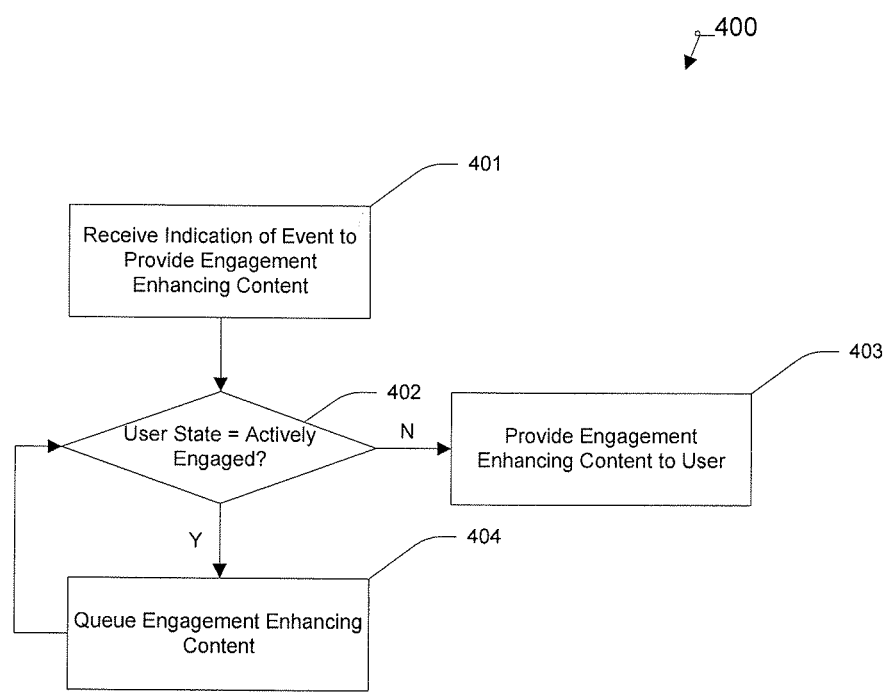
FIG. 4 illustrates a flow chart of an exemplary process for optimally presenting engagement enhancing content for display to a user.

FIG. 4 illustrates a flow chart of an exemplary process 400 for optimally presenting engagement enhancing content for display to a user. Process 400 optimizes the benefits of the engagement enhancing content for display to the user interacting with a client device (e.g., electronic devices 102, 104 and 106) by presenting the engagement enhancing content in a manner that is aimed to reduce distractions during periods where the user is actively engaged at the website. The process 400 may be performed for example with respect to events triggering engagement enhancing content to be provided for display to the user at a client device (e.g., electronic devices 102, 104 and 106).

In step 401, the system receives an indication of an event that may be presented to the user as engagement enhancing content. For example, engagement enhancing content may include visual or audible notifications or other indication of events corresponding to third party actions performed with respect to the user (e.g., posts or comments entered by other users, friend requests received, a new message or chat message received). Upon detecting the event, the system may generate engagement enhancing content to smoothly animate or otherwise represent the event in real time. When the system receives the indication of an event in step 401, the process continues to step 402.

In step 402, the system determines whether the user state of the user is set to actively engaged. The user state may be maintained within a storage area accessible by the system (e.g., through server 110). The system may access the user state to determine if the user state of the user is set to actively engaged. If in step 402 it is determined that the user state is set to passively browsing, in step 403, the engagement enhancing content corresponding to the event associated with the received indication in step 401 is provided for display to the user (e.g., in real time).

Otherwise, in step 404, the system queues the engagement enhancing content and returns to step 402 until the user state is set to passively browsing, at which time the engagement enhancing content is provided for display to the user in step 403. Thus, the system may suspend or delay the provision of the engagement enhancing content to the user until the user state is set to passively browsing. In some examples, only some of the engagement enhancing content may be queued and/or provided for display to the user after the user state is set to passively browsing.

While the above processes and methods are described with respect to engagement enhancing content presented to the a user interacting with a website, it should be understood by one skilled in the art that the process and methods described herein may be performed with respect to any system providing engagement enhancing content to a user. For example, the above described processes may be performed with respect to various "client software", such as browsers, or mobile phone applications, games or any other client software which supports providing notifications or other engagement enhancing content to a user interacting with the client software. Furthermore, same or similar method and processes may also be used for presenting other contents such as advertisements, surveys or other secondary content to the user while the user is interacting with a website, client software or other similar systems.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
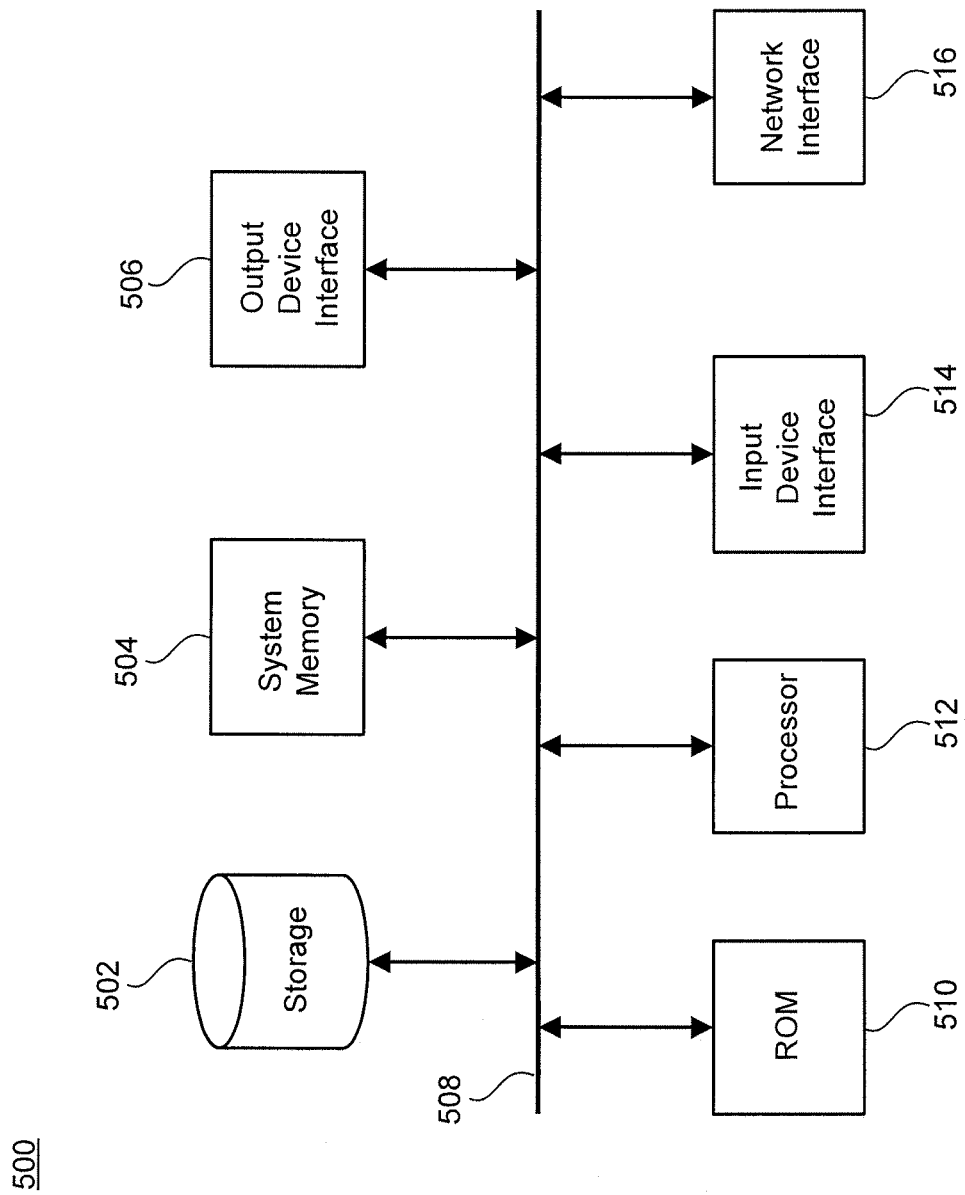
FIG. 5 conceptually illustrates an electronic system with which some implementations of the subject technology are implemented.

FIG. 5 conceptually illustrates an electronic system with which some implementations of the subject technology are implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for providing engagement enhancing content to a user in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touchscreen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for providing engagement enhancing content to a user without interfering with activities performed by the user at a website, the method comprising:
   receiving a first indication that the user is actively interacting with content at the website based on a combination score of one or more signals representing user actions satisfying a predefined threshold;
   suspending the provision of one or more engagement enhancing content to the user in response to receiving the indication, wherein the engagement enhancing content comprises additional content associated with activities performed with respect to the user by other users within the website and presented in the website as part of the content and is configured to encourage user interaction with the content at the website;
   receiving a second indication that the user is no longer actively interacting with content at the website; and
   resuming provision of the one or more engagement enhancing content to the user in response to receiving an indication of the second event, wherein the resuming causes the engagement enhancing content to be provided at the website.

2. The method of claim 1, further comprising setting a user state of the user to actively engaged in response to receiving the first indication.

3. The method of claim 2, wherein suspending the provision of the one or more engagement enhancing content is performed in response to determining that the user state has been set to actively engaged.

4. The method of claim 1, further comprising setting a user state of the user to passively browsing in response to receiving the second indication.

5. The method of claim 4, wherein resuming the provision of the one or more engagement enhancing content is performed in response to determining that the user state has been set to passively browsing.

6. The method of claim 1, wherein the engagement enhancing content comprises audio or visual content and represents one or more of content representing a notification, or content provided in an ongoing or period basis, wherein the content is configured to encourage user interaction with the website.

7. The method of claim 1, wherein at least one of the one or more signals corresponds to a user action at the website, the user action indicating that the user is actively engaged with the content at the website.

8. The method of claim 7, wherein the user action comprises at least one of the users posting content to the website, viewing content at the website, uploading content to the website, or downloading content from the website.

9. The method of claim 1, wherein receiving the second indication comprises one of receiving an indication that the user action has terminated, receiving an indication that a specified time has lapsed since the user action was detected, or receiving an indication that a specific time has lapsed since the user action terminated.

10. The method of claim 1, wherein resuming the provision of the one or more engagement enhancing content comprises providing the one or more engagement enhancing content for display to the user.

11. A system for providing engagement enhancing content to a user interacting with a website, the system comprising:
one or more processors; and
a machine-readable medium comprising instructions stored therein, which when executed by the processors, cause the processors to perform operations comprising:
receiving an indication of a user state of a user being set to actively engaged based on a combination score of one or more signals representing user actions satisfying a predefined threshold, wherein the user state being set to actively engaged reflects that the user is actively interacting with content at the website;
suspending the provision of one or more engagement enhancing content to the user in response to receiving the indication, wherein the engagement enhancing content comprises additional content associated with activities performed with respect to the user by other users within the website and presented in the website as part of the content and is configured to encourage user interaction with the content at the website;
determining that the user state has been set to passively browsing, wherein the user state being set to passively browsing reflects that the user is no longer actively interacting with the content at the website; and
resuming provision of the one or more engagement enhancing content to the user in response to determining that the user state has been set to passively browsing.

12. The system of claim 11, the operations further comprising:
receiving an indication of the user actively interacting with the website, wherein the indication is received in response to a user action being detected at the website; and
setting the user state of the user to actively engaged in response to receiving the indication.

13. The system of claim 11, the operations further comprising:
determining that the user is no longer actively interacting with the website; and
setting the user state of the user to passively browsing in response to determining that the user is no longer actively interacting with the website.

14. The system of claim 11, wherein the user action comprises at least one of the users posting content to the website, viewing content at the website, uploading content to the website, or downloading content from the website.

15. A non-transitory machine-readable medium comprising instructions stored therein, which when executed by a machine, cause the machine to perform operations comprising:
receiving an indication of a user actively interacting with content at a website based on a combination score of one or more signals representing user actions satisfying a predefined threshold;
setting a user state of the user to actively engaged in response to receiving the indication;
suspending the provision of one or more engagement enhancing content to the user in response to the user state being set to actively engaged, wherein the engagement enhancing content comprises additional content associated with activities performed with respect to the user by other users within the website and presented in the website as part of the content and is configured to encourage user interaction with the content at the website;
receiving an indication that the user is no longer actively interacting with the website;
setting a user state of the user to passively browsing in response to receiving the indication that the user is no longer actively interacting with the website; and
resuming provision of the one or more engagement enhancing content to the user at the website in response to setting the user state to passively browsing.

16. The method of claim 1, wherein the engagement enhancement content comprises a notification of an event corresponding to third party actions performed with respect to the user.

* * * * *